United States Patent
He et al.

(10) Patent No.: US 12,071,377 B2
(45) Date of Patent: Aug. 27, 2024

(54) PREPARATION METHOD OF FLY ASH-BASED CERAMIC MEMBRANE SUPPORT

(71) Applicant: Central South University, Changsha (CN)

(72) Inventors: Zhiguo He, Changsha (CN); Hui Zhong, Changsha (CN); Weiqi Xie, Changsha (CN)

( * ) Notice: Subject to any disclaimer, the term of this patent is extended or adjusted under 35 U.S.C. 154(b) by 0 days.

(21) Appl. No.: 18/398,792

(22) Filed: Dec. 28, 2023

(65) Prior Publication Data

US 2024/0217879 A1  Jul. 4, 2024

(30) Foreign Application Priority Data

Dec. 30, 2022 (CN) .......................... 202211731364.8

(51) Int. Cl.
| | |
|---|---|
| *C04B 35/18* | (2006.01) |
| *C04B 35/622* | (2006.01) |
| *C04B 35/626* | (2006.01) |
| *C04B 35/634* | (2006.01) |
| *C04B 35/636* | (2006.01) |

(Continued)

(52) U.S. Cl.
CPC ........ *C04B 35/18* (2013.01); *C04B 35/62204* (2013.01); *C04B 35/62655* (2013.01); *C04B 35/6269* (2013.01); *C04B 35/63488* (2013.01); *C04B 35/6365* (2013.01); *C04B 35/64* (2013.01); *C04B 38/0675* (2013.01); *C04B 2235/3463* (2013.01); *C04B 2235/349* (2013.01); *C04B 2235/606* (2013.01);

(Continued)

(58) Field of Classification Search
CPC ............................................... C04B 35/62204
See application file for complete search history.

(56) References Cited

U.S. PATENT DOCUMENTS

| 6,342,461 B1* | 1/2002 | Lee ..................... C04B 33/1327 |
| | | 501/141 |
| 2012/0031306 A1* | 2/2012 | Belden ................ C04B 33/1324 |
| | | 264/609 |
| 2020/0407278 A1* | 12/2020 | Gau ..................... C04B 33/1327 |

FOREIGN PATENT DOCUMENTS

CN  115466096 A  * 12/2022

OTHER PUBLICATIONS

CN 115466096 A (Dai) Dec. 13, 2022 (English language translation). [online] [retrieved Feb. 13, 2024]. Retrieved from: Clarivate Analytics. (Year: 2022).*

(Continued)

*Primary Examiner* — Erin Snelting
(74) *Attorney, Agent, or Firm* — Sandy Lipkin

(57) ABSTRACT

The present disclosure provides a preparation method of a fly ash-based ceramic membrane support, including the following steps: 1) subjecting fly ash to alkali washing and acid washing to obtain pretreated fly ash; 2) blending a raw material including the pretreated fly ash, and then conducting aging and extrusion molding to obtain a green body; and 3) spraying a surface water-retaining agent (including glycerol, tung oil, a diol, and polyethylene glycol) on a surface of the green body to allow static curing in a constant-temperature and constant-humidity environment, and then conducting drying and sintering after the curing is completed. The preparation method can effectively improve molding and sintering performances of the fly ash to obtain a fly ash-based ceramic membrane support with a qualified performance.

6 Claims, 3 Drawing Sheets

(51) Int. Cl.
*C04B 35/64* (2006.01)
*C04B 38/06* (2006.01)

(52) U.S. Cl.
CPC ............... *C04B 2235/6562* (2013.01); *C04B 2235/6567* (2013.01); *C04B 2235/667* (2013.01)

(56) References Cited

OTHER PUBLICATIONS

First Office Action received in Chinese Application No. 202211731364.8, Issued by China National Intellectual Property Administration, dated Jun. 17, 2023, 7 pages.

\* cited by examiner

PREPARATION METHOD OF FLY ASH-BASED CERAMIC MEMBRANE SUPPORT

CROSS REFERENCE TO RELATED APPLICATION

This patent application claims the benefit and priority of Chinese Patent Application No. 202211731364.8 filed with the China National Intellectual Property Administration on Dec. 30, 2022, the disclosure of which is incorporated by reference herein in its entirety as part of the present application.

TECHNICAL FIELD

The present disclosure relates to a preparation method of a ceramic membrane support, specifically to a preparation method of a fly ash-based ceramic membrane support, and belongs to the technical field of ceramic materials.

BACKGROUND

Currently, raw materials for the preparation of ceramic membrane supports are mainly high-purity $Al_2O_3$, $SiO_2$, and $ZrO_2$. However, the raw materials such as $Al_2O_3$ and $ZrO_2$ have high costs and sintering temperatures, resulting in high preparation costs. In order to improve this situation, there have been many studies at home and abroad on using tailings or mineral raw materials as starting materials to prepare porous ceramic substrates.

Relevant studies have shown that fly ash contains a large amount of active silicon (aluminum) oxygen tetrahedrons, rich useful components based on metal oxides, and valuable properties that have not been recognized and yet to be discovered, thus showing obvious resource and material properties. Compounding bulk metallurgical slags with tailings for the preparation of ceramic membranes can not only solve the environmental pollutions of water, air, soil and other carriers as well as land occupation in mining areas caused by the accumulation of industrial solid waste, but also turn waste into wealth. The solid waste can be used to obtain high-performance and high-value-added porous ceramics to achieve bulk, high-value, efficient, and safe utilization of the solid waste.

However, there are still many problems in preparing ceramic membrane supports from the fly ash. Fly ash is dust collected after high-temperature combustion of coal, and contains a large number of glass microspheres with different sizes. These microspheres make a melting temperature of the fly ash have a poor range deviation, which is difficult to control. Moreover, a pore-forming effect of the support is easily weakened due to particle accumulation, affecting the porosity. In addition, the fly ash generally contains a high content of unburned residual carbon. During the blending, a hydrophobic film may form on the surface of residual carbon particles to affect the infiltration of water, thereby increasing a water demand of the ceramic mud and then easily causing cracking during a drying process after molding. Furthermore, due to the high content of residual carbon, local spontaneous combustion is prone to occur during the sintering, leading to thermal stress cracking.

SUMMARY

In view of the defects existing in preparation of ceramic membrane supports using the fly ash in the prior art, an objective of the present disclosure is to provide a preparation method of a fly ash-based ceramic membrane support. The preparation method can improve a molding performance of fly ash particles, reduce an influence of glass microspheres on sintering, and prevent cracking during the molding and sintering of a green body by washing, impurity removal, and surface modification of the fly ash. Meanwhile, a special surface water-retaining agent during curing and drying in the preparation method can avoid the cracks caused by inconsistent drying rates inside and outside the green body. In this way, a ceramic membrane support can be obtained with a high molding pass rate and a desirable appearance quality.

In order to achieve the above technical objective, the present disclosure provides a preparation method of a fly ash-based ceramic membrane support, including the following steps:

1) subjecting fly ash to alkali washing and acid washing to obtain pretreated fly ash;
2) blending a raw material including the pretreated fly ash, and then conducting aging and extrusion molding to obtain a green body; and
3) spraying a surface water-retaining agent on a surface of the green body to allow static curing in a constant-temperature and constant-humidity environment, and then conducting drying and sintering after the curing is completed; where the surface water-retaining agent includes glycerol, tung oil, a diol, and polyethylene glycol.

In the present disclosure, a key to the technical solution is as follows: on one hand, the fly ash is washed. After alkali washing and acid washing, iron, calcium and other metals or alkaline oxides as well as carbon particles can be removed in the fly ash. The surface of original fly ash particles is relatively smooth and dense, while the surface of treated fly ash particles becomes rough, forming many grooves and pores. These grooves and pores increase a specific surface area of the particles and facilitate particle contact, such that a sintering phase is easily formed during the sintering, thus reducing a sintering temperature. At the same time, there is a direct destructive effect on a silicate glass network in the fly ash, especially on the glass microspheres, thereby effectively avoiding an impact of the glass microspheres on sintering. It should be noted that the order of alkali washing and then acid washing is also high important. $K_2O$ and $Na_2O$ remaining after the alkali washing may cause mullite formed during the sintering to decompose and then form a nepheline liquid phase, which affects the performance of the support. On this basis, the acid washing can remove most of the alkaline substances. On the other hand, a composite surface water-retaining agent is used, including glycerol, tung oil, a diol, and polyethylene glycol. Since fly ash particles have poor water-locking properties, there are a high initial drying rate and high drying stress after ceramic mud extrusion, making the green body prone to deformation and cracking. The composite surface water-retaining agent can delay the initial drying of surface moisture, and can also reduce the friction between the green body and a backing plate to prevent shrinkage and cracking. The tung oil and diol in the composite surface water-retaining agent serve as benign solvents and can fully dissolve and disperse the glycerol. At the same time, the tung oil can also improve a lubrication performance of the green body on the surface. Polyethylene glycol provides a certain consistency and viscosity to the solution, while glycerol, as a main moisturizing component, has the effect of absorbing moisture and can delay the drying of the green body using moisture in the air.

Preferably, the alkali washing is conducted with an alkali washing solution selected from the group consisting of 2 wt % to 4 wt % of a sodium hydroxide solution and 15 wt % to 25 wt % of a sodium carbonate solution at a solid-to-liquid ratio of 1 kg:1.5 L to 1 kg:3 L. The preferred alkali washing solution during the alkali washing can effectively destroy the impact of a silicate glass network, especially glass microspheres, thus avoiding the impact of the glass microspheres in fly ash on the sintering.

Preferably, the acid washing is conducted with an acid washing solution selected from the group consisting of 1 wt % to 3 wt % of a citric acid solution, 3 wt % to 7 wt % of a hydrochloric acid solution, 1 wt % to 5 wt % of a sulfuric acid solution, and 0.5 wt % to 3 wt % of a nitric acid solution at a solid-to-liquid ratio of 1 kg:0.5 L to 1 kg:2.5 L. The preferred acid washing solution during the acid washing is mainly used to remove iron, calcium and other metals or alkaline oxides from the fly ash. It is best to control an acid concentration at a low level, such that some alkaline substances can be retained in the fly ash as a flux to achieve lowering the sintering temperature.

Preferably, the raw material includes the pretreated fly ash, a plastic clay, a pore-forming agent, a low-temperature binder, water, a lubricant, a water-retaining agent, a water-reducing agent, and a release agent.

Preferably, the raw material includes the following components in parts by mass: 80 parts to 95 parts of the pretreated fly ash, 6 parts to 9 parts of the plastic clay, 5 parts to 8 parts of the pore-forming agent, 2 parts to 4 parts of the low-temperature binder, 20 parts to 28 parts of the water, 1 part to 2 parts of the lubricant, 2 parts to 4 parts of the water-retaining agent, 0.5 parts to 1 part of the water-reducing agent, and 0.1 parts to 0.3 parts of the release agent.

Preferably, the blending includes: mixing the pretreated fly ash with the plastic clay, mixing with the water-reducing agent, mixing with the water-retaining agent and the lubricant, mixing with the pore-forming agent and the low-temperature binder, and mixing with the release agent. The order in which each component is added during the blending can enable organic components such as the water-reducing agent to wrap fly ash particles in advance to form a wettable film. The wettable film can improve a water-reducing effect of the water-reducing agent and effectively reduce a water demand of the ceramic mud. The reduction in water demand slows down a water loss rate of the green body in an early stage of drying, thus controlling the occurrence of drying defects. Preferably, the blending includes: mixing the pretreated fly ash with the plastic clay for 25 min to 35 min, mixing with the water-reducing agent for 3 min to 8 min, mixing with the water-retaining agent and the lubricant for 3 min to 8 min, mixing with the pore-forming agent and the low-temperature binder for 3 min to 8 min, and mixing with the release agent for 5 min to 10 min.

Preferably, the plastic clay is at least one selected from the group consisting of a Suzhou clay and a granite powder.

Preferably, the pore-forming agent is at least one selected from the group consisting of corn starch and saw dust.

Preferably, the low-temperature binder includes a cellulose.

Preferably, the lubricant includes a long-chain fatty acid methyl ester (FAME).

Preferably, the water-reducing agent includes a lignosulfonate.

Preferably, the water-retaining agent is at least one selected from the group consisting of polyethylene glycol and sodium silicate.

Preferably, the release agent includes an emulsified silicone oil.

Preferably, the surface water-retaining agent is prepared from the glycerol, the tung oil, the diol, and the polyethylene glycol at a mass ratio of (1-2.5):(2-4):(0.3-0.7):(0.5-1). The low proportion of glycerol relative to tung oil and diol results in poor moisturizing effect of the water-retaining agent. If the proportion of glycerol to tung oil and diol is too high, it may be difficult to form a uniform dispersion and the moisturizing effect of glycerol cannot be fully exerted. If the proportion of tung oil to diol is too low, it may be difficult to fully dissolve and disperse the glycerol, and the moisturizing effect of glycerol cannot be fully exerted. An added amount of the polyethylene glycol can effectively adjust consistency and viscosity of the surface water-retaining agent within a suitable range.

Preferably, the surface water-retaining agent is sprayed on the surface of the green body at (5-10) g/0.1 $m^2$. For example, the weight of a 1,000 mm*100 mm support body is 6 g to 8 g increased after spraying.

Preferably, the static curing is conducted at 20° C. to 25° C. with a relative humidity of 25%±5% for 8 h to 12 h.

Preferably, the drying is microwave drying at 160° C. to 180° C. for 1 h to 3 h. The microwave drying conducted under the condition of using a surface water-retaining agent can further control the drying rate, ensure a consistent drying rate inside and outside the green body, and inhibit the occurrence of cracks.

Preferably, the sintering is conducted by burying sintering combined with low-temperature slow sintering; the burying sintering is conducted with a burying sintering sand including an alumina sand and/or a zirconia sand; and the low-temperature slow sintering includes: heating from 25° C. to 180° C. at 0.5° C./min to 1.5° C./min, heating from 180° C. to 550° C. at 0.2° C./min to 0.8° C./min and holding the temperature of 550° C. for 30 min to 90 min, heating from 550° C. to 900° C. at 3° C./min to 4° C./min, and heating from 900° C. to 1,350° C. at 3° C./min to 5° C./min and holding the temperature of 1,350° C. for 1.5 h to 2.5 h. The burying sintering can ensure uniform heating of the green body during sintering, improve the uniformity of a firing performance of the support body, and control the discharge of organic combustion gases in the green body at a uniform speed to reduce cracking during the sintering. More preferably, the burying sintering sand has a median diameter of 30 m to 45 m.

In the present disclosure, the fly ash particles are ground and sieved by an airflow pulverizer and an airflow classifier to obtain particles with a particle size of 9 μm to 10.5 μm.

In the present disclosure, the preparation method of the fly ash-based ceramic membrane support specifically includes the following steps:

1) subjecting the fly ash to a pretreatment by alkali washing and acid washing to obtain the pretreated fly ash;

2) adding inorganic raw materials of the pretreated fly ash and the plastic clay, mixing using a counter-flow mixer for 25 min to 35 min, mixing with the water-reducing agent for 3 min to 8 min, mixing with the water-retaining agent and the lubricant for 3 min to 8 min, mixing with the pore-forming agent and the low-temperature binder for 3 min to 8 min, and mixing with the release agent for 5 min to 10 min to obtain a mixed ceramic mud;

3) aging the mixed ceramic mud for 18 h to 32 h at 20° C. to 25° C., conducting extrusion molding, conducting first pugging at 2 MPa to 3 MPa, vacuumizing to 0.1 atmospheric pressure to allow second pugging, aging for 4 h to 6 h after the second pugging is completed, and then molding to obtain the green body;

4) spraying the surface of the green body with the surface water-retaining agent to allow the static curing in the constant-temperature and constant-humidity environment at 20° C. to 25° C. with a relative humidity of 25%±5% for 8 h to 12 h to achieve stable and controllable control of a drying rate and a consistency of internal and external drying rates, as well as reduce drying and cracking of the green body; conducting microwave drying at 160° C. to 180° C. for 1 h to 3 h; where the surface water-retaining agent is prepared from the glycerol, the tung oil, the diol, and the polyethylene glycol at a mass ratio of (1-2.5):(2-4):(0.3-0.7):(0.5-1); and 5) subjecting a resulting dried green body to burying sintering combined with low-temperature slow sintering; where the low-temperature slow sintering includes: heating from 25° C. to 180° C. at 0.5° C./min to 1.5° C./min, heating from 180° C. to 550° C. at 0.2° C./min to 0.8° C./min and holding the temperature of 550° C. for 30 min to 90 min, heating from 550° C. to 900° C. at 3° C./min to 4° C./min, and heating from 900° C. to 1,350° C. at 3° C./min to 5° C./min and holding the temperature of 1,350° C. for 1.5 h to 2.5 h, thereby achieving high-temperature and controllable removal of organic matters and preventing spontaneous combustion.

Compared with the prior art, the technical solutions of the present disclosure bring the following beneficial technical effects:

In the present disclosure, the preparation method of a fly ash-based ceramic membrane support conducts a pretreatment by alkali washing and acid washing of the fly ash, and iron, calcium and other metals or alkaline oxides as well as carbon particles can be removed in the fly ash. The surface of original fly ash particles is relatively smooth and dense, while the surface of treated fly ash particles becomes rough, forming many grooves and pores. These grooves and pores increase a specific surface area of the particles and facilitate particle contact, such that a sintering phase is easily formed during the sintering, thus reducing a sintering temperature. At the same time, there is a direct destructive effect on a silicate glass network in the fly ash, especially on the glass microspheres, thereby effectively avoiding an impact of the glass microspheres on sintering.

In the present disclosure, the preparation method of a fly ash-based ceramic membrane support optimizes and adjusts an order of adding each component in the blending, and can enable organic components such as the water-reducing agent to wrap fly ash particles in advance to form a wettable film. The wettable film can improve a water-reducing effect of the water-reducing agent and effectively reduce a water demand of the ceramic mud. The reduction in water demand slows down a water loss rate of the green body in an early stage of drying, thus controlling the occurrence of drying defects.

In the present disclosure, the preparation method of a fly ash-based ceramic membrane support uses a special surface water-retaining agent, such that a solvent evaporation rate can be further controlled during the curing and drying. In this way, the drying rates inside and outside the green body are ensured to be consistent and the occurrence of cracks is suppressed.

In the present disclosure, the preparation method of a fly ash-based ceramic membrane support uses burying sintering combined with low-temperature slow sintering, which can ensure uniform heating of the green body during sintering, improve the uniformity of a firing performance of the support body, and control the discharge of organic combustion gases in the green body at a uniform speed to reduce cracking during the sintering.

In the present disclosure, the fly ash-based ceramic membrane support has no cracking on its surface, uniform color and gloss, and no obvious shrinkage and deformation, and is a qualified fly ash-based ceramic membrane support product.

DETAILED DESCRIPTION OF THE EMBODIMENTS

The following examples are intended to further illustrate the protection content of the present disclosure and are not intended to limit the protection scope of the present disclosure.

All chemical raw materials used in the following examples are commercially available products, unless otherwise specified.

Example 1

Step 1: fly ash particles were ground and sieved through an airflow pulverizer and an airflow classifier to obtain a fly ash powder with a particle size of 9.5 m; alkali washing was conducted with 3 wt % NaOH solution, at powder:liquid=1:2; acid washing was conducted with 1.5 wt % citric acid, at powder:liquid=1:0.8.

Step 2: based on 10 g of each part, 80 parts of 9.5 μm fly ash and 6 parts of Suzhou clay were mixed with a counterflow mixer for 25 min; 0.7 parts of lignosulfonate was added and mixed for 5 min; 1 part of 99.9% pure FAME and 3 parts of glycerol were added and mixed for 5 min; 5.5 parts of corn starch and 2 parts of cellulose were mixed for 5 min; 22 parts of 75° C. water and 0.3 parts of an emulsified silicone oil were added and stirred for 25 min, and then mixed in a mixer for 7 min.

Step 3: a resulting mixed ceramic mud was aged for 24 h at 25° C., extrusion molding was conducted, first pugging was conducted at 3 MPa, vacuumizing was conducted to 0.1 atmospheric pressure to allow second pugging, aging was conducted for 5 h after the second pugging was completed, and then molding was conducted to obtain a green body.

Step 4: a surface water-retaining agent was prepared using glycerol, tung oil, a diol, and polyethylene glycol according to a mass ratio of 1:2:0.3:0.5, and stirred evenly before use; the green body was sprayed with the surface water-retaining agent at 6 g/0.1 m² in a constant-temperature and constant-humidity environment at 24° C. with a relative humidity of 25%, cured for 10 h, and then dried in a microwave dryer at 170° C. for 2 h.

Step 5: an obtained dried green body was subjected to burying sintering using an alumina sand with a particle size of 30 m, where a sintering program included: heating from 25° C. to 180° C. at 1.2° C./min, heating from 180° C. to 550° C. at 0.4° C./min and holding the temperature of 550° C. for 60 min, heating from 550° C. to 900° C. at 3° C./min, and heating from 900° C. to 1,350° C. at 4° C./min and holding the temperature of 1,350° C. for 2 h, and then a resulting sintered support was taken out after natural cooling.

Figure 1:
FIG. 1 shows a ceramic mud of the fly ash-based ceramic membrane support prepared in Example 1; where the ceramic mud has moderate hardness and desirable plasticity.
Figure 2:
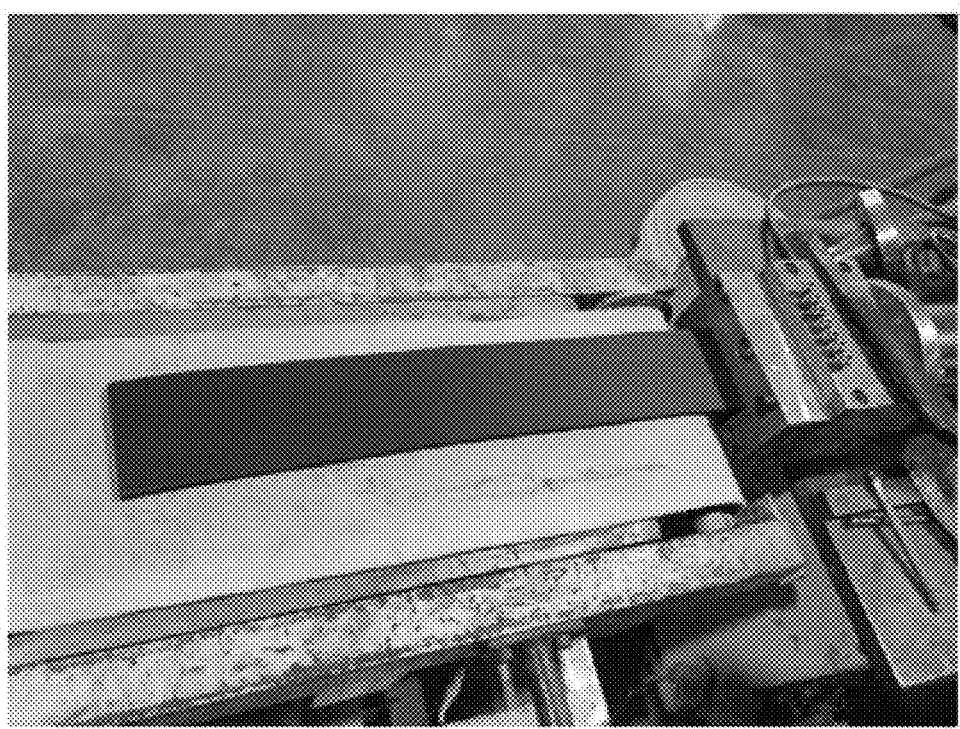
FIG. 2 shows a green body of the fly ash-based ceramic membrane support prepared in Example 1.
Figure 3:
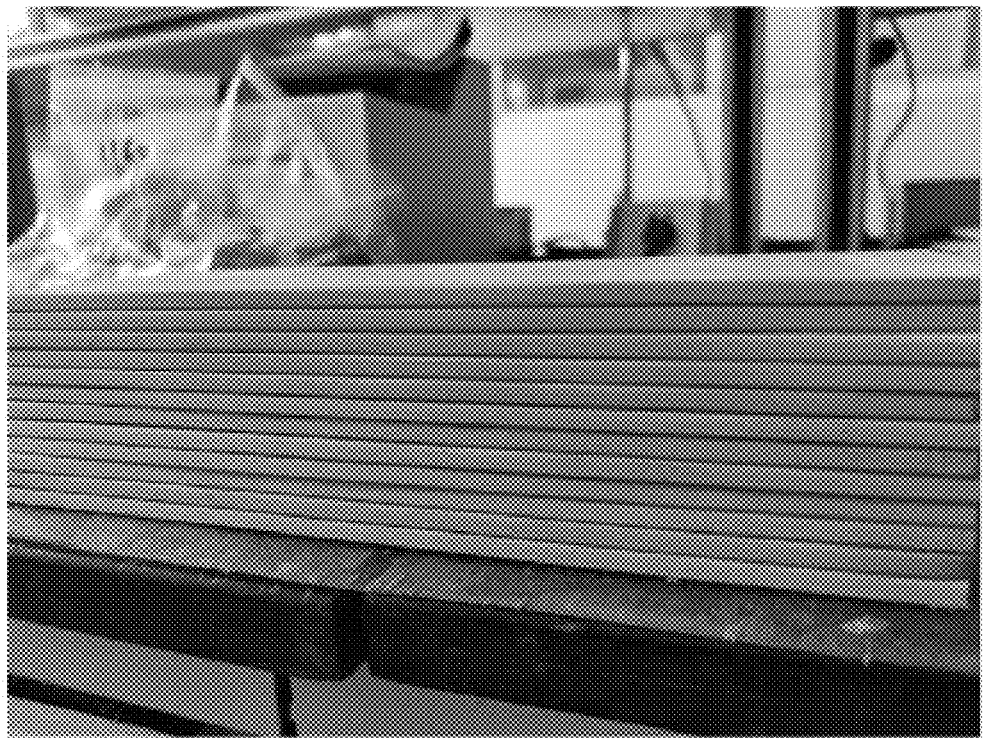
FIG. 3 shows the fly ash-based ceramic membrane support prepared in Example 1.

During the preparation of the fly ash-based ceramic membrane support in this example, the ceramic mud, green body, and sintered body were shown in FIG. 1 to FIG. 3, respectively. As shown in FIG. 1 to FIG. 3, the ceramic mud had moderate hardness and desirable plasticity, which were conducive to extrusion molding. The extruded green body had no cracking on its surface and showed high uniformity. The sintered support had a surface with no cracking.

Example 2

Step 1: fly ash particles were ground and sieved through an airflow pulverizer and an airflow classifier to obtain a fly ash powder with a particle size of 9.5 μm; alkali washing was conducted with 16 wt % sodium carbonate solution, at powder:liquid=1:3; acid washing was conducted with 1.5 wt % nitric acid, at powder:liquid=1:1.5.

Step 2: based on 10 g of each part, 95 parts of 9.5 μm fly ash and 9 parts of Suzhou clay were mixed with a counter-flow mixer for 25 min; 0.7 parts of lignosulfonate was added and mixed for 5 min; 1 part of 99.9% pure FAME and 4 parts of glycerol were added and mixed for 5 min; 5.5 parts of corn starch and 2 parts of cellulose were mixed for 5 min; 22 parts of 75° C. water and 0.3 parts of an emulsified silicone oil were added and stirred for 25 min, and then mixed in a mixer for 7 min.

Step 3: a resulting mixed ceramic mud was aged for 30 h at 25° C., extrusion molding was conducted, first pugging was conducted at 3 MPa, vacuumizing was conducted to 0.1 atmospheric a reagent pressure to allow second pugging, aging was conducted for 5 h after the second pugging was completed, and then molding was conducted to obtain a green body.

Step 4: a surface water-retaining agent was prepared using glycerol, tung oil, a diol, and polyethylene glycol according to a mass ratio of 2:3:0.6:0.7, and stirred evenly before use; the green body was sprayed with the surface water-retaining agent at 6 g/0.1 m² in a constant-temperature and constant-humidity environment at 24° C. with a relative humidity of 25%, cured for 10 h, and then dried in a microwave dryer at 170° C. for 2 h.

Step 5: an obtained dried green body was subjected to burying sintering using an alumina sand with a particle size of 30 m, where a sintering program included: heating from 25° C. to 180° C. at 1° C./min, heating from 180° C. to 550° C. at 0.5° C./min and holding the temperature of 550° C. for 60 min, heating from 550° C. to 900° C. at 4° C./min, and heating from 900° C. to 1,350° C. at 5° C./min and holding the temperature of 1,350° C. for 1.5 h, and then a resulting sintered support was taken out after natural cooling.

Figure 5:
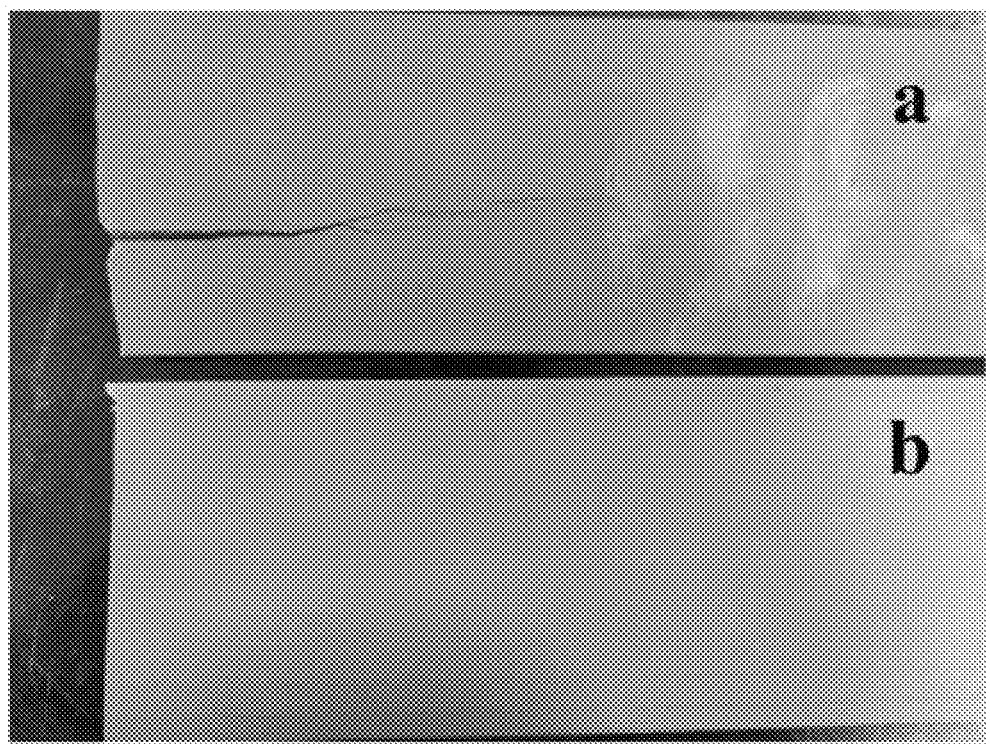
FIG. 5 shows the fly ash-based ceramic membrane supports prepared in Example 2 and Comparative Example 2 (a: Comparative Example 2, and b: Example 2); where after sintering, the support cracks and has a darker appearance, indicating that there is poor discharge of organic matters inside, and a shrinkage rate of the support becomes higher.

The fly ash-based ceramic membrane support prepared in this example had no cracks on its surface, uniform size and color, and no shrinkage or deformation, and was a qualified fly ash-based ceramic membrane support product, as shown in b in FIG. 5.

Comparative Example 1

Step 1: fly ash particles were ground and sieved through an airflow pulverizer and an airflow classifier to obtain a fly ash powder with a particle size of 9.5 μm; alkali washing was conducted with 3 wt % NaOH solution, at powder:liquid=1:2; acid washing was conducted with 1.5 wt % citric acid, at powder:liquid=1:0.8.

Step 2: based on 10 g of each part, 80 parts of 9.5 μm fly ash and 6 parts of Suzhou clay were mixed with a counter-flow mixer for 25 min; 0.7 parts of lignosulfonate was added and mixed for 5 min; 1 part of 99.9% pure FAME and 3 parts of glycerol were added and mixed for 5 min; 5.5 parts of corn starch and 2 parts of cellulose were mixed for 5 min; 22 parts of 75° C. water and 0.3 parts of an emulsified silicone oil were added and stirred for 25 min, and then mixed in a mixer for 7 min.

Step 3: a resulting mixed ceramic mud was aged for 24 h at 25° C., extrusion molding was conducted, first pugging was conducted at 3 MPa, vacuumizing was conducted to 0.1 atmospheric pressure to allow second pugging, aging was conducted for 5 h after the second pugging was completed, and then molding was conducted to obtain a green body.

Step 4: The green body was cured in a constant-temperature and constant-humidity environment at 24° C. with a relative humidity of 25% for 10 h and allowed to stand for 2 h, and then dried in a microwave dryer at 170° C. for 2 h.

Figure 4:
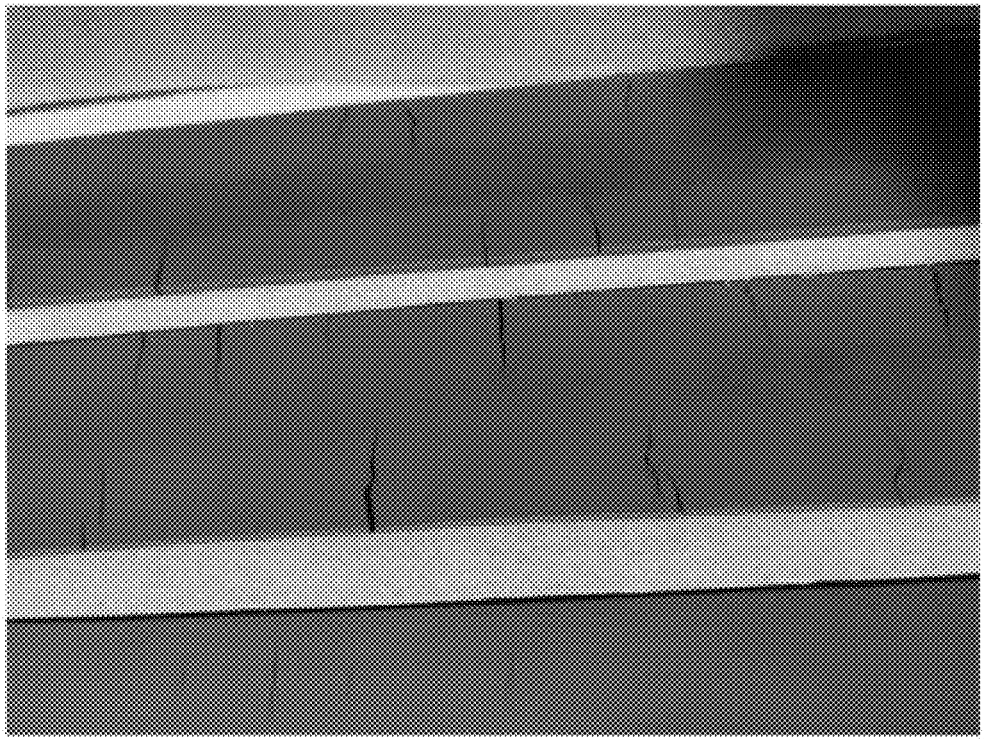
FIG. 4 shows a green body of the fly ash-based ceramic membrane support prepared in Comparative Example 1, where a large number of transverse cracks appear after drying.

In this comparative example, no surface water-retaining agent was sprayed on the surface of the fly ash-based ceramic membrane support, and a large number of transverse cracks appeared in the green body after drying, as shown in FIG. 4. It was impossible to obtain a fly ash-based ceramic membrane support with no surface cracks through further sintering.

Comparative Example 2

Step 1: fly ash particles were ground and sieved through an airflow pulverizer and an airflow classifier to obtain a fly ash powder with a particle size of 9.5 μm; alkali washing was conducted with 16 wt % sodium carbonate solution, at powder:liquid=1:3; and acid washing was conducted with 1.5 wt % nitric acid, at powder:liquid=1:1.5.

Step 2: based on 10 g of each part, 95 parts of 9.5 μm fly ash and 9 parts of Suzhou clay were mixed with a counter-flow mixer for 25 min; 0.7 parts of lignosulfonate was added and mixed for 5 min; 1 part of 99.9% pure FAME and 4 parts of glycerol were added and mixed for 5 min; 5.5 parts of corn starch and 2 parts of cellulose were mixed for 5 min; and 22 parts of 75° C. water and 0.3 parts of an emulsified silicone oil were added and stirred for 25 min, and then mixed in a mixer for 7 min.

Step 3: a resulting mixed ceramic mud was aged for 30 h at 25° C., extrusion molding was conducted, first pugging was conducted at 3 MPa, vacuumizing was conducted to 0.1 atmospheric a reagent pressure to allow second pugging, aging was conducted for 5 h after the second pugging was completed, and then molding was conducted to obtain a green body.

Step 4: a surface water-retaining agent was prepared using glycerol, tung oil, a diol, and polyethylene glycol according to a mass ratio of 2:3:0.6:0.7, and stirred evenly before use; the green body was sprayed with the surface water-retaining agent at 6 g/0.1 m² in a constant-temperature and constant-humidity environment at 24° C. with a relative humidity of 25%, cured for 10 h, and then dried in a microwave dryer at 170° C. for 2 h.

Step 5: an obtained dried green body was subjected to sintering as follows: heating from 25° C. to 550° C. at 2.5° C./min, heating from 550° C. to 900° C. at 5° C./min, and heating from 900° C. to 1,350° C. at 5° C./min and holding the temperature of 1,350° C. for 1.5 h, and then a resulting sintered support was taken out after natural cooling.

In this comparative example, the burying sintering was not conducted. It was clearly seen that the fly ash-based ceramic membrane support cracked after sintering, and the support was darker in color. This indicated that there was poor discharge of organic matters, as shown in a in FIG. 5. Moreover, a shrinkage rate of the support became larger, and its size was significantly different from a designed size.

Comparative Example 3

Step 1: based on 10 g of each part, 95 parts of 9.5 μm fly ash and 9 parts of Suzhou clay were mixed with a counter-flow mixer for 25 min; 0.7 parts of lignosulfonate was added and mixed for 5 min; 1 part of 99.9% pure FAME and 4 parts of glycerol were added and mixed for 5 min; 5.5 parts of corn starch and 2 parts of cellulose were mixed for 5 min; and 22 parts of 75° C. water and 0.3 parts of an emulsified silicone oil were added and stirred for 25 min, and then mixed in a mixer for 7 min.

Step 2: a resulting mixed ceramic mud was aged for 30 h at 25° C., extrusion molding was conducted, first pugging was conducted at 3 MPa, vacuumizing was conducted to 0.1 atmospheric a reagent pressure to allow second pugging, aging was conducted for 5 h after the second pugging was completed, and then molding was conducted to obtain a green body.

Step 3: a surface water-retaining agent was prepared using glycerol, tung oil, a diol, and polyethylene glycol according to a mass ratio of 2:3:0.6:0.7, and stirred evenly before use; the green body was sprayed with the surface water-retaining agent in a constant-temperature and constant-humidity environment at 24° C. with a relative humidity of 25%, cured for 10 h, and then dried in a microwave dryer at 170° C. for 2 h.

Step 4: an obtained dried green body was subjected to burying sintering using an alumina sand with a particle size of 30 μm, where a sintering program included: heating from 25° C. to 180° C. at 1° C./min, heating from 180° C. to 550° C. at 0.5° C./min and holding the temperature of 550° C. for 60 min, heating from 550° C. to 900° C. at 4° C./min, and heating from 900° C. to 1,350° C. at 5° C./min and holding the temperature of 1,350° C. for 1.5 h, and a resulting sintered support was taken out after natural cooling.

Figure 6:
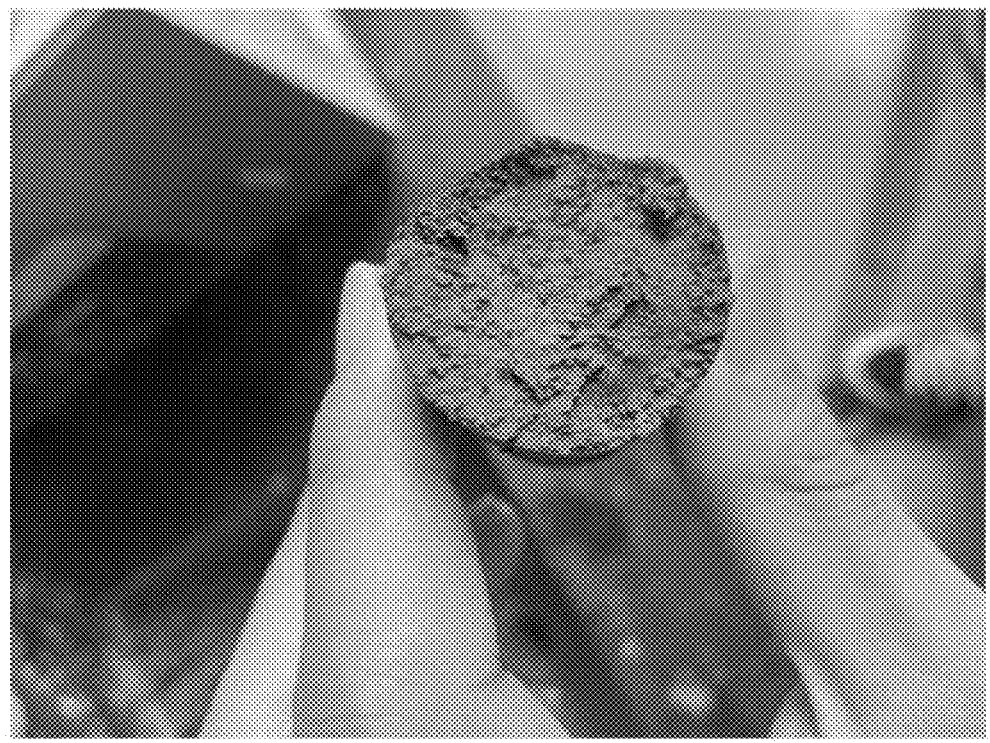
FIG. 6 shows a ceramic mud of the fly ash-based ceramic membrane support prepared in Comparative Example 3; where the ceramic mud is hard and loose, and has a low viscosity, which is not conducive to molding.

In this comparative example, the fly ash was not washed and pretreated, and there were differences in the batching methods. This resulted in the prepared ceramic mud being hard, loose, and low in viscosity, which was not conducive to molding. A specific ceramic mud state was shown in FIG. 6.

What is claimed is:

1. A preparation method of a fly ash-based ceramic membrane support, comprising the following steps:
   1) subjecting fly ash to alkali washing and acid washing to obtain pretreated fly ash; wherein the alkali washing is conducted using an alkali washing solution selected from the group consisting of 2 wt % to 4 wt % of a sodium hydroxide solution and 15 wt % to 25 wt % of a sodium carbonate solution, and a solid-to-liquid ratio of the alkali washing solution is in a range of 1 kg: 1.5 L to 1 kg: 3 L; and the acid washing is conducted using an acid washing solution selected from the group consisting of 1 wt % to 3 wt % of a citric acid solution, 3 wt % to 7 wt % of a hydrochloric acid solution, 1 wt % to 5 wt % of a sulfuric acid solution, and 0.5 wt % to 3 wt % of a nitric acid solution, and a solid-to-liquid ratio of the acid washing solution is in a range of 1 kg: 0.5 L to 1 kg: 2.5 L;
   2) blending a raw material, and then conducting aging and extrusion molding to obtain a green body; the raw material comprises the following components in parts by mass: 80 parts to 95 parts of the pretreated fly ash, 6 parts to 9 parts of a plastic clay, 5 parts to 8 parts of a pore-forming agent, 2 parts to 4 parts of a binder, 20 parts to 28 parts of water, 1 part to 2 parts of a lubricant, 2 parts to 4 parts of a water-retaining agent, 0.5 parts to 1 part of a water-reducing agent, and 0.1 parts to 0.3 parts of a release agent; and
   3) spraying a surface water-retaining agent on a surface of the green body to allow static curing in a constant-temperature and constant-humidity environment, and then conducting drying and sintering after the curing is completed; wherein the surface water-retaining agent is prepared from glycerol, tung oil, a diol, and polyethylene glycol at a mass ratio of (1-2.5):(2-4):(0.3-0.7):(0.5-1).

2. The preparation method of a fly ash-based ceramic membrane support according to claim 1, wherein the blending is performed in the following order: mixing the pretreated fly ash with the plastic clay, mixing with the water-reducing agent, mixing with the water-retaining agent and the lubricant, mixing with the pore-forming agent and the binder, and mixing with the release agent.

3. The preparation method of a fly ash-based ceramic membrane support according to claim 2, wherein
   the plastic clay is at least one selected from the group consisting of a Suzhou clay and a granite powder;
   the pore-forming agent is at least one selected from the group consisting of corn starch and saw dust;
   the binder comprises a cellulose;
   the lubricant comprises a long-chain fatty acid methyl ester (FAME);
   the water-reducing agent comprises a lignosulfonate; and
   the release agent comprises an emulsified silicone oil.

4. The preparation method of a fly ash-based ceramic membrane support according to claim 1, wherein the surface water-retaining agent is sprayed on the surface of the green body at (5-10) g/0.1 m².

5. The preparation method of a fly ash-based ceramic membrane support according to claim 1, wherein the static curing is conducted at 20° C. to 25° C. with a relative humidity of 25%±5% for 8 h to 12 h; and
   the drying is microwave drying at 160° C. to 180° C. for 1 h to 3 h.

6. The preparation method of a fly ash-based ceramic membrane support according to claim 1, wherein the sintering is conducted by burying sintering combined with low-temperature slow sintering; the burying sintering is conducted with a burying sintering sand comprising an alumina sand and/or a zirconia sand; and the low-temperature slow sintering comprises: heating from 25° C. to 180° C. at 0.5° C./min to 1.5° C./min, heating from 180° C. to 550° C. at 0.2° C./min to 0.8° C./min and holding the temperature of 550° C. for 30 min to 90 min, heating from 550° C. to 900° C. at 3° C./min to 4° C./min, and heating from 900° C. to 1,350° C. at 3° C./min to 5° C./min and holding the temperature of 1,350° C. for 1.5 h to 2.5 h.

* * * * *